Dec. 24, 1968   C. J. STALMACH, JR., ET AL   3,418,445
APPARATUS FOR SUPPLYING HIGH ENERGY
GAS STREAMS TO A WIND TUNNEL
Filed April 7, 1965   3 Sheets-Sheet 1

CHARLES J. STALMACH, JR.
GENE P. SCHELL
INVENTORS

BY H C Goldvere
AGENT

CHARLES J. STALMACH, JR.
GENE P. SCHELL
INVENTORS

BY JHCGoldwire
AGENT

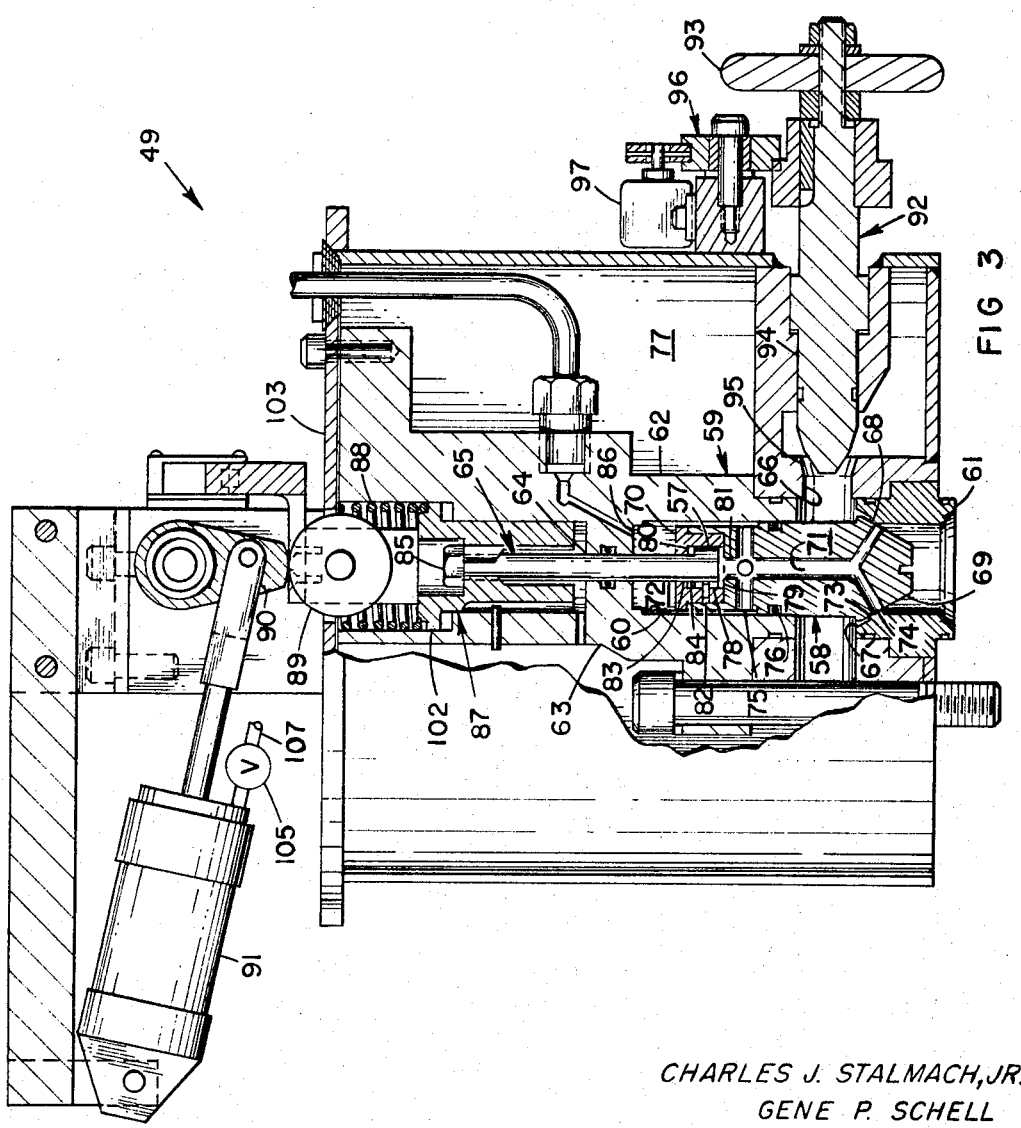

3,418,445
APPARATUS FOR SUPPLYING HIGH ENERGY GAS STREAMS TO A WIND TUNNEL
Charles J. Stalmach, Jr., Grand Prairie, and Gene P. Schell, Irving, Tex., assignors to LTV Aerospace Corporation, Dallas, Tex., a corporation of Delaware
Filed Apr. 7, 1965, Ser. No. 446,190
18 Claims. (Cl. 219—121)

ABSTRACT OF THE DISCLOSURE

An apparatus is provided for supplying a heated and pressurized gas to a wind tunnel. The apparatus includes an arc chamber positioned adjacent to the wind tunnel nozzle and having a pair of diametrically spaced electrodes extending into the chamber. A slidable piston element is positioned in a bore connecting the arc chamber to an activating chamber such that upon discharge of a predetermined amount of electrical energy across the electrodes, the activating chamber releases the piston which in turn discharges the pressurized gas through the nozzle.

---

This invention relates to means for supplying high temperature and velocity gases, and more particularly to means for supplying a high-velocity stream of heated gas to a wind tunnel.

The desire to study phenomena related to high Mach number gas dynamics has prompted many approaches to the problems of providing gas at suitable pressures, temperatures, enthalpies, etc., for useful testing periods. One of the more promising approaches has been the use of "hot-shot" tunnels in which a large quantity of electrical energy is substantially instantaneously discharged across two spaced electrodes, and the heat generated by the discharge is transferred to the gas between the electrodes; the heated gas is vented through an accelerating nozzle into the test section of a wind tunnel. While such an apparatus may provide quite high intial temperatures and pressures in the discharge or arc chamber, these values are rapidly reduced as the gas is vented to the wind tunnel. In fact, usable run times for tests are seldom as high as 50 milliseconds even at Mach numbers considered relatively modest for a high-performance, hypervelocity wind tunnel.

The disadvantage of short usable run times is really only a generalization of the problem inherent in prior-art, hot-shot wind tunnels, which problem is a direct result of the pressure decay accompanying the flow of heated gas out of a fixed-volume arc chamber. Thus, a more explicit statement of the problem would be that properties of the test gas in the test section are not constant with time; and, as tolerances on allowable variations in testing conditions are made more exacting, the length of the testing period at which testing conditions may be approximated as constant is correspondingly reduced. Directly contributing to the short run time is the fact that a small arc chamber is usually desirable in heating devices of this type, because of considerations of costs of electrical energy, surface areas for heat transfer from the heated gas to the walls of the arc chamber, and contamination of the test gas with particles eroded from the electrodes during electrical discharge; consequently, a pressure decay of about 1% per millisecond is an average value for an arc chamber of typical volume. Thus, at the end of a test lasting only 50 milliseconds, the pressure in such a chamber diminishes to approximately one-half its initial value, with the velocity of the gas exiting through a fixed nozzle being correspondingly reduced. Since the density of the gas flowing into the wind tunnel from previous arc chambers decreases with time, computations of flow coefficients and test conditions must be made for very small but practicable increments of time, e.g., every millisecond, in order to properly correlate test conditions with test results.

One approach to alleviation of the pressure decay problem has been to increase the volume of the reservoir (i.e., the arm chamber in a hot-shot apparatus) which supplies gas to the wind tunnel, such that a required mass flow into the wind tunnel will be a smaller percentage of the total quantity of heated gas in the reservoir. It should be noted, however, that this expedient merely reduces and does not eliminate the decay. Also, there must be a greater discharge of electrical energy in order that the greater quantity of gas may be heated; not only does this require additional, expensive equipment having a greater capacity plus an elaborate synchronizing means, it also introduces the possibility of severe gas contamination caused by electrode decomposition. Further, it is difficult to obtain adequate mixing of the test gas in a large arc chamber; and inadequate mixing causes hot and cold spots that contribute to erratic test conditions in the tunnel.

Since all of the initially heated gas is not usable because of pressure decay in previous arc chambers, a single test could never last long enough to provide dynamic stability data on wind tunnel test models having an oscillating frequency as low as 20 cycles per second. Because at least five cycles of motion are desirable for a dynamic stability test, a run time of at least 0.25 second would be required for a single, complete test at 20 c.p.s.—a time period previously in excess of the performance of arc chambers. Neither could an arc chamber characteristic of the prior art provide increasing pressures or increasing Reynolds numbers as a test progressed to more nearly simulate, for example, a segment of the atmospheric entry trajectory of a nose cone as it encounters denser air in coming closer to earth. Quite the contrary, the previously known arc chambers can only produce testing parameters that decrease with time rather than remain constant or increase.

Consequently, a major object of this invention is to provide a means of controlling the test parameters in a wind tunnel throughout the testing period, and more particularly to provide a means of controlling the pressure in such a tunnel.

Another object is to extend the usable run time of a hypervelocity wind tunnel without increasing the volume of the reservoir that supplies said wind tunnel with test gas.

A further object is to reduce heat losses from a reservoir of heated and pressurized test gas during a relatively long testing period.

Yet another object is to eliminate pressure decay in a reservoir as gas is vented from the reservoir to a wind tunnel.

A still further object is to provide a means of increasing the Reynolds number during a test in a hypervelocity wind tunnel.

Still another object is to increase the efficiency of a hot-shot wind tunnel by providing a means of utilizing substantially all of the gas that is heated and pressurized in the arc chamber.

An additional object is to provide a means of discharging the least possible amount of electrical energy as a spark between two spaced electrodes for sufficiently heating the gas in an arc chamber, to thereby minimize contamination of the heated gas by electrode decomposition.

Another object is to simulate atmospheric entry conditions during a single test in a hypervelocity wind tunnel.

Other objects and advantages will be apparent from the specification and claims and from the accompanying drawing illustrative of the invention.

In the drawing:

FIGURE 3 is a partially cross-sectioned view of the release valve shown in FIGURE 2.

Figure 1:
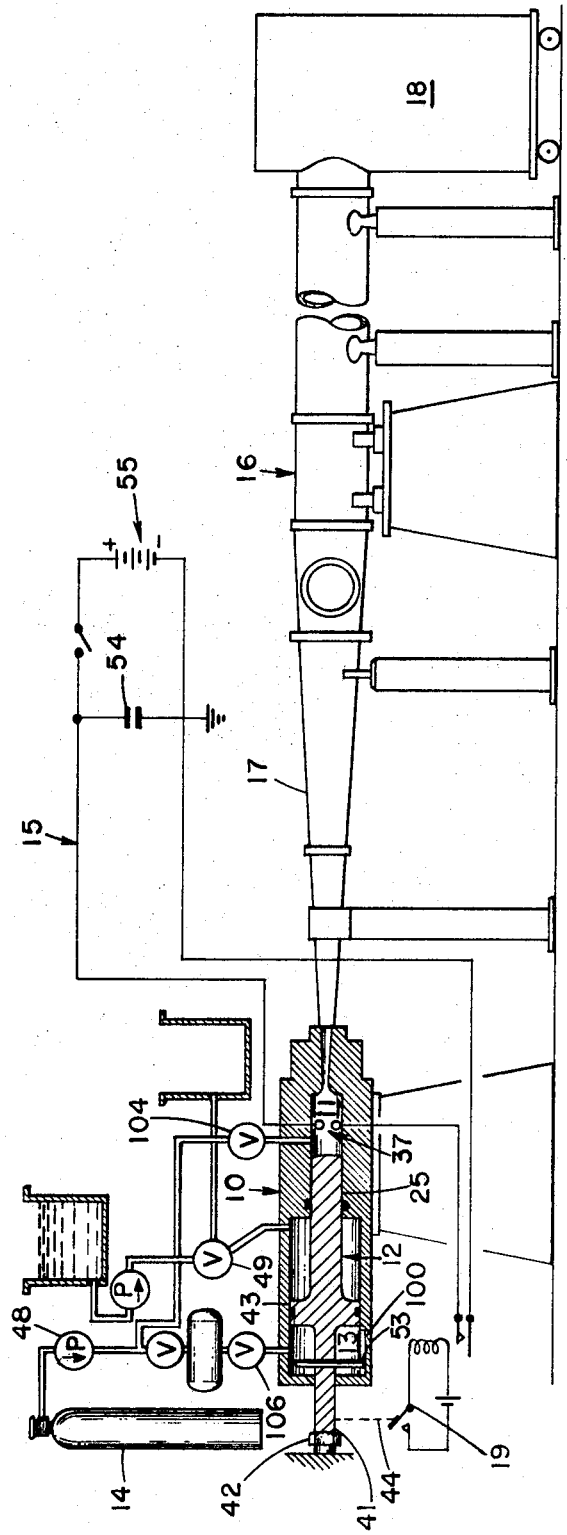
FIGURE 1 is a diagrammatic view of parts of a wind tunnel installation employing the variable-volume chamber of the invention, some of the parts thereof being shown in sectional view.

With initial reference to FIGURE 1, the apparatus comprises a housing 10 enclosing a chamber 11, a volume-reducing means including a piston assembly 12 and a resilient means such as a compartment 13 of compressed gas for moving the piston assembly into the chamber, a source of pressurized gas 14 and means for transferring the gas to the chamber, a heating means 15 comprising an electrical circuit to be described, a wind tunnel 16 connected with the chamber through a nozzle 17, and a vacuum tank 18 which receives the gas after it has been vented from the chamber during a test. As will be more fully explained herein, the volume-reducing means is operable for reducing the volume of the chamber in coordination with (i.e., in predetermined timed relationship) the operation of the heating means, means for providing this coordination being represented by the microswitch 19 operable, through linkage 44, by the piston assembly.

Figure 2:
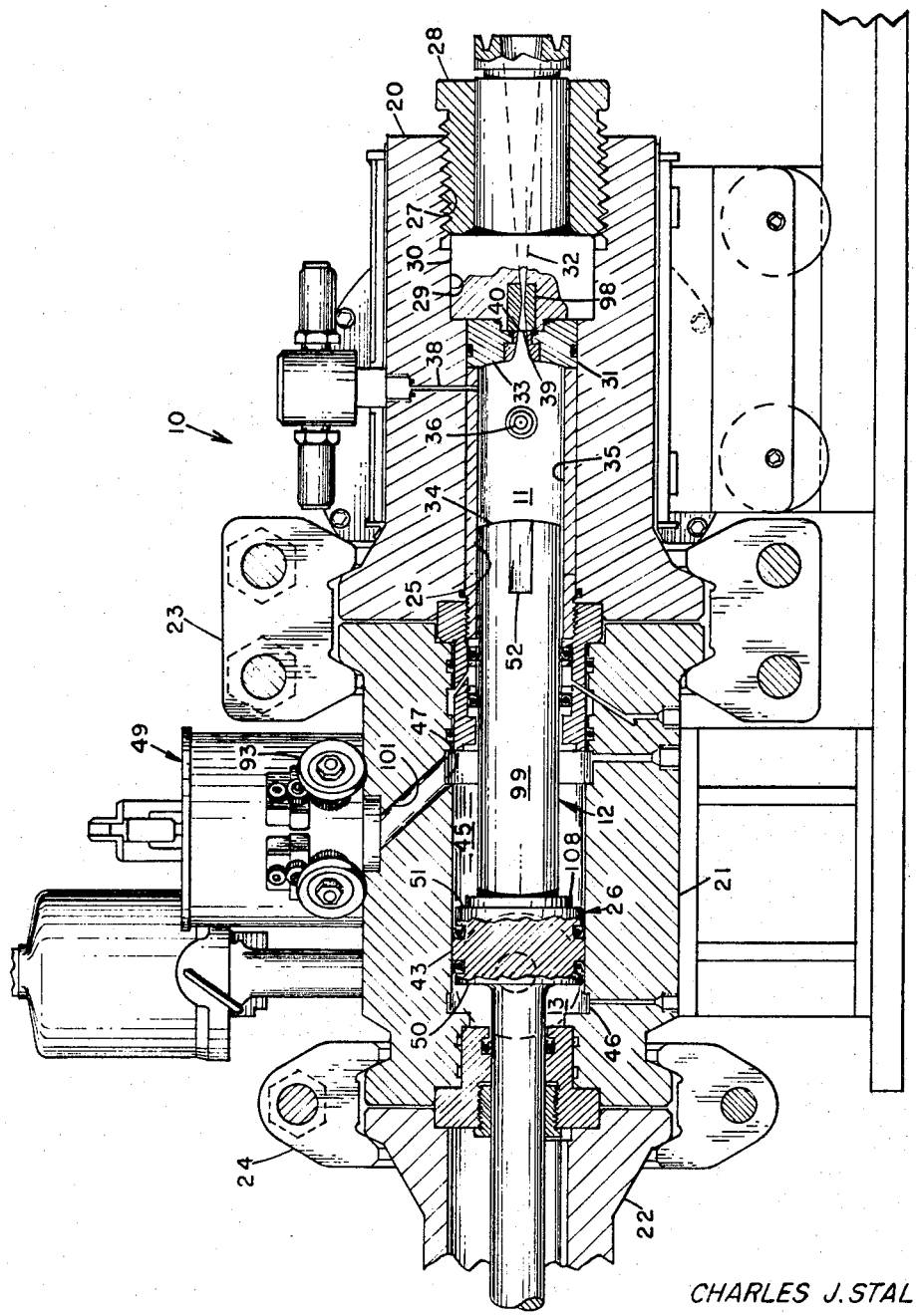
FIGURE 2 is a longitudinal, cross-sectional view of the chamber and piston assembly shown in FIGURE 1.

With added reference to FIGURE 2, the housing 10 is assembled, for convenience, from first, second, and third steel castings 20, 21, 22 held together by first and second, annular clamping rings 23, 24 with suitable bolts. The three castings 20, 21, 22 having a coaxial, central bore 25, one portion of which bore comprises the arc chamber 11, and another portion of which comprises an activiating chamber 26 for receiving certain fluids.

A terminal portion 27 of the bore 25 in the first casting 20 is provided with internal threads to sealingly mate with an externally threaded element 28 of the nozzle 17, the nozzle element having a passage coaxial with and in communication with the bore. The bore 25 further has an annular, relieved surface 29 for sealingly mating with the external wall 30 of a cylindrical plug assembly 31, which plug assembly is rigidly held in the bore by the threaded nozzle element 28. The plug assembly 31 also has a passage 32 throughout its length coaxial with the bore 25, which passage comprises a portion of the accelerating nozzle 17. A preferred construction of a portion of said axial passage 32 is in form of one or more sets of replaceable inserts 98, which inserts sealingly fit interiorly of the plug assembly 31. An end surface 33 of the cylindrical plug assembly 31 sealingly closes one end of the bore 25, thereby forming a fixed wall therein. As illustrated, the surface of the fixed wall 33 is gently flared inwardly toward the axial passage 32 to provide a bell-mouth configuration that facilitates smooth flow of gas from the arc chamber 11 into the axial passage. The piston asssembly 12, slidably movable within the bore 25, has a first end 34 which constitutes a movable wall spaced from the fixed wall 33, the fixed wall and the movable wall and the cylindrical surface 35 of the bore 25 therebetween defining the closed, variable-volume arc chamber 11. The first end 34 of the piston assembly 12 preferably has a configuration that closely matches that of the surface or fixed wall 33 to the end that a near-minimal volume remains between the fixed wall and the movable wall when the walls are adjacent one another at the conclusion of a test and substantially all of the heated gas has been vented to the wind tunnel 16. A nomial value for the initial volume of one embodiment of the illustrated arc chamber 11 is 50 cubic inches, with the piston 12 having a stroke of about 6 inches. The cyindrical surface or wall 35 of the chamber 11 has at least one pair of diametrically spaced orifices, such as orifice 36, through which at least one pair of electrodes 37 communicate with the interior of the chamber. The electrodes 37, which are electrically insulated from the cylindrical wall 35 and sealingly fill the orifices 36, comprise a part of an electric arc heating means 15 (to be more fully described). The arc chamber 11 has an inlet 38 for the introduction of a predetermined quantity of gas (for example, nitrogen) from said source of pressurized gas 14. The quantity of gas which is admitted to the arc chamber 11 is a variable which is dependent on the particular test to be conducted, but initial pressures of 1,000 to 2,000 p.s.i. are typical for obtaining the desired gas density in the chamber.

The axial passage 32 in the plug assembly 31 intersects the wall 33 which comprises the fixed or closed end of the arc chamber 1 forming a discharge orifice 39 in the fixed end which is coaxial with the bore 25 which is in communication with the wind tunnel 16. The discharge orifice 39 is initially stopped, i.e., sealingly covered, by a means such as a rupturable diaphragm 40 before the arc chamber 11 is filled with gas; a typically employed material for a diaphragm is Mylar having a thickness of 0.0075 inch, but any diaphragm which will rupture or vaporize when the gas is raised significantly above its initial temperature and/or pressure level would be satisfactory. The discharge orifice 39 and the rupturable diaphragm 40 together comprise means for establishing communication between the wind-tunnel nozzle 17 and the arc chamber 11 in coordination with the operation of the heating and volme-reducing means 15, 12. However, the apparatus is not limited to use with a diaphragm 40 since a valve could be substituted therefor without affecting the operation of the apparatus.

The piston assembly 12 has a second end 41 which extends axially beyond the limits of the housing 10 where the second end abuts against a limiting means 42 such as an adjustable screw which is external to the housing. The limiting means 42 is adapted for adjusting the initial, static position of the piston assembly 12 with respect to the arc chamber 11, or more particularly, with respect to the fixed end 33 of the arc chamber, whereby the initial volume of the arc chamber may be adjusted without adding or removing internal inserts as is the practice with some chambers. The piston assembly 12 further has an annular projection 43 between its first end 34 and its second end 41, which projection constitutes a piston sealingly accommodated in the activating chamber 26 in the housing 10, which chamber is coaxial with and of larger diameter than the arc chamber 11, said activating chamber being affixed relative to the arc chamber. The annular projection 43 divides the activating chamber 26 into a first compartment 13 and a second compartment 45 having "working" fluids, said working fluids being so described in contradistinction to "testing" fluids which are vented to the wind tunnel 16. The first working fluid in said first compartment 13 serves as a biasing means to bias the movable wall 34 toward the fixed wall 33 of the arc chamber 11, there being suitable connecting means 99 between the piston 43 and the movable wall 34. The first fluid is preferably a pneumatic fluid, and when unopposed, serves as a means for urging the movable wall 34 from a first position spaced from the fixed wall 33 into the arc chamber 11 to a second position closer to the fixed wall. A convenient pneumatic fluid is nitrogen, which may be supplied from the same source 14 which supplies the gas for the arc chamber 11. A first working or biasing fluid pressure of approximately 15,000 p.s.i. is occasionally necessary to accelerate and maintain a piston 12 at a desired velocity, e.g., 2 or 3 feet per second, without oscillations. Accordingly, a compressor 48 is employed as required to further compress nitrogen taken from a standard storage bottle 14. The ratio of the cross-sectional areas of the activating chamber 26 and the arc chamber 11, and the maximum expected arc chamber pressure, defines the necessary pressure of the first working fluid. The second working fluid is preferably a hydraulic fluid, for example, Cellulube 220 manufactured by the Celanese Corporation of America; said fluid, when under pressure, serves to oppose the movement of the piston 43 toward the fixed end 33. The second working or blocking fluid, being a liquid, is substantially incompressible; thus, even a pressure of 30,000 p.s.i. on the fluid can be almost instantaneously reduced to any desired value with a suitable quick-acting valve 49 (to be described). While the gas which is initially admitted to the interior of the arc chamber 11 at, for example, 1,000 p.s.i. does bias the piston assembly 12 away from the chamber closed end 33, the second working fluid constitutes a means distinct from the gas for holding the movable wall 34 away from the closed end. When the blocking fluid is holding the volume-reducing piston assembly 12 in place, the pressurized, pneumatic biasing fluid constitutes a resilient source of potential energy, the activating chamber 26 constitutes a means for storing the potential energy, and the quick-acting valve 49 constitutes a means for releasing the potential energy at a controlled rate by controllably draining the blocking fluid from the second compartment 45. As will be more fully explained later, it is desirable to rapidly release the pressure of the second working fluid during operation of the apparatus. It is also desirable to move a minimum volume of fluid during operation in order to minimize valve size and the intertia of the moving parts of the system; therefore, the ring projection 43 having one annular face 50 exposed to a first fluid and a second annular face 51 exposed to a second fluid is so designed that a smaller effective area is operated on by the second (liquid) working fluid than by the first (pneumatic) working fluid. The smaller effective area directly and advantageously contributes to a smaller volume in the second compartment 45, which means that a smaller quantity of liquid must be moved in the operating system. Since a hydraulic pressure of approximately 30,000 p.s.i. is reasonably obtainable, and a nominal pressure of 15,000 p.s.i. is frequently employed in the first pneumatic compartment 13, an effective area ratio of approximately 1 to 2 is provided between the two annular faces 50, 51 of the ring projection 43. Thus, the hydraulic blocking means has an operating pressure approximately twice that of the pneumatic biasing means, but it is only operative on approximately one half the area; the two means then are approximately equal in magnitude or effectiveness and the piston 43 remains static until the hydraulic pressure is controllably released.

The apparatus further includes a heating means 15 for controllably heating said predetermined quantity of gas in the chamber 11, which is a means for discharging a predetermined amount of electrical energy across two spaced electrodes as a high-temperature spark. While an alternate heating means would not materially affect the operation of the volume-reducing-elements of the apparatus, the electrical heating means described herein has such pronounced advantages that the invention has only been described in conjunction with such a means, it being understood that the coordinated volume-reducing principle described herein would be equally appropriate with another heating device. Further, while two specific electrodes are shown, it is not intended thereby to exclude the use of more than two electrodes or even the practice of using a wall of the arc chamber as one of the electrodes. The electric arc heating means is commonly known, but the essential elements thereof are herein described, as required, to show their relation to other parts of the subject invention. The arc heating means 15 has at least one pair of spaced electrodes 37 extending into the arc chamber 11; however, the electrodes must not interfere wtih the movement of the piston assembly 12 therebetween. Accordingly, notches such as 52 (FIGURE 2) are cut in the piston assembly 12 at appropriate places to provide ample clearance for the electrodes 37. A guide pin 53 (FIGURE 1) slidable in chamber groove 100 is further provided to assure proper orientation of the piston assembly 12 as it slides within the housing 10. A source of electrical energy is connected to the electrodes 37, which source is typically a group or bank of capacitors such as 54 connected in parallel and combined with a means 55 for charging the capacitors. Suitable circuitry (not specifically shown) is also included for generating a high temperature electric arc between the electrodes 37 using a predetermined amount of electrical energy from the source 54, the heat released by the arc being absorbed by the test gas in the arc chamber 11. A timing or actuating means is employed to provide the necessary coordination between the discharge of electrical energy between the electrodes 37 in relation to the movement of the piston assembly 12 into the arc chamber 11. As shown in FIGURE 1, this coordination is provided by a microswitch 19 connected by linkage 44 to the piston assembly 12. However, since the movement of the piston assembly 12 as illustrated in FIGURE 2 is dependent on the release of said blocking fluid, it may be preferred to mechanically connect the timing means 19 to the quick-acting valve means 49 which releases the blocking liquid from the second compartment 45. Furthermore, the valve means 49 begins to operate before the piston assembly 12 actually moves, hence versatility in providing the necessary coordination between volum-reduction and heating is possible when the timing means 19 is activated by the valve means. Depending on the pressure of the first biasing fluid, the density of the test gas as charged in the arc chamber 11, and the amount of electrical energy discharged across the electrodes 37, the timing of said electrical discharge may be adjusted to occur immediately prior to, exactly at, or immediately after the release of said second pressurizing fluid from said second compartment 45.

Said quick-acting valve means 49 is a critical element in the apparatus, for it must controllably release as much as 30,000 p.s.i. hydraulic pressure almost instantaneously, whereby the piston assembly 12 may quickly accelerate and move into the arc chamber 11 driving the heated gas through the discharge orifice 39 before said gas has experienced any undesirable changes in its parameters, e.g., pressure and temperature. While it is, of course, very difficult to obtain true adiabatic conditions in the arc chamber 11 because of heat losses to the walls of the chamber, the valve 49 and piston assembly 12 can affect the temperature of the gas almost as surely as the pressure over short periods of time. The release valve 49 is characterized as a pressure-balanced valve and is analogous to a pilot-type valve in that the variable position of a small pilot element 57 (FIGURE 3) determines the balance of pressure forces which bias a valve stem 58 toward a first or a second position. The valve 49 comprises a cylindrical sleeve 59 or a housing having an axial bore 60 therein. Said sleeve 59 has a first end 61 and a second end 62, the first end being in communication with the second compartment 45 (which is merely a pressure vessel as related to the valve) through a housing wall passage 101 (FIGURE 2). The second end 62 is closed with a suitable means 63 (FIGURE 3). The means 63 closing the sleeve second end 62 has a port 64 for sealing by and slidably accommodating a rod member 65, the rod having a purpose which will become apparent in a later paragraph. The sleeve 59 further has one or more radial discharge orifices such as 66, 67 between the first and second ends 61, 62. An internal valve seat 68 is annularly disposed in the sleeve 59 between the sleeve first end 61 and the one or more discharge orifices 66, 67, the internal diameter of the sleeve below the valve seat (adjacent the second compartment) being slightly less than the internal diameter of the sleeve above the valve seat. The valve stem 58 is slidably movable within the sleeve 59, the stem having a first end 69 and a second end 70 and a passage 71 extending therebetween. The stem second end 70 and the means 63 closing the sleeve second end 62 and the portion of the bore 60 therebetween form a sleeve chamber 72 above the stem 58. The stem first end 69 has a surface 73 which is shaped for mating with the valve seat 68, the stem passage 71 having a first opening 74 which communicates with the second compartment 45 at all positions of the valve stem 58 including the position at which the stem first end 69 bears against the valve seat 68. A second end 75 of the stem passage 71 is in communication with sleeve chamber 72, whereby the sleeve chamber is in communication with the second compartment 45 through the valve stem 58. The stem 58 further has a suitable external, peripheral sealing means 76 such as an O-ring in a location between the sleeve discharge orifices 66, 67 and the sleeve chamber 72. Thus, with the stem first end 69 bearing against the valve seat 68, the discharge orifices 66, 67 are sealed off from the activating chamber second compartment 45 which is below and further sealed off from the sleeve chamber 72 which is above the orifices; the valve seat 68 and the O-ring 76 and the portion of the stem 58 therebetween therefore constitute means blocking the discharge orifices. When the valve stem 58 is lifted from its sealed position in which it seals seat 68, pressurized fluid in the second compartment 45 may flow externally around the stem first end 69 to the discharge orifices 66, 67 and thence to a relatively low-pressure drainage tank 77.

The pilot element 57 is connected with the valve stem 58 by being slidably retained in a cavity 78 in the stem, the cavity having a bottom wall 79, a top wall 80 and an opening 81 serving as means for communicating with the stem passage 71, whereby fluid in the secnd compartment 45 and sleeve chamber 72 is also admitted to the cavity. The pilot element 57 fits somewhat loosely within the cavity 78 so that fluid may freely pass from the bottom of the cavity around the pilot element to the top of the cavity. A guide pin 82 riding in suitable pilot element slot is included to prevent unwanted rotation of the pilot element 57 within the cavity 78 while allowing linear movement of the element. A port 83 in the top wall 80 of the cavity 78 is concentric with an approximately equal in size to the port 64 in the means 63 for closing the sleeve second end 62, the cavity port 83 being adapted to slidably receive the rod member 65. The rod member 65 has a first end 84 and a second end 85 and is rigidly attached at the first end thereof to the pilot element 57 whereby the pilot element may be positioned within the cavity 78 by moving the rod second end 85 which is outside of the sleeve 59. The pilot element 57 and the valve stem 58 have dimensions that are suitably proportioned such that when the blocking liquid is admitted to the sleeve 59 through a port 86, the pressure of the liquid in the sleeve causes the valve stem to be tightly seated against the valve seat 68 while the pilot element is forced upwardly to a first position, intermediate the cavity top and bottom walls 80, 79, at which it transmits no load to the valve stem. The pilot element 57 is shown in this first position in FIGURE 3.

The rod member 65 is connected at its second end 85 to a guide means 87 which includes a sleeve or collar 102 rigidly mounted on the rod member second end 85, a coiled spring 88 footed on the collar 102 and in compression between the same and a continuation of the tank upper wall 103, and a roller 89, the roller being adapted to cooperate with a cam 90. The cam 90 is preferably rotatable by an actuator or air cylinder 91 and has a first, unactuated position in moving to which it forces the roller 89 and rod member 65 downwardly, whereby the pilot element 57 is prevented from bearing against the cavity top wall 80. The cam 90 has a second, actuated position in which the rod member 65 is free to moxe axially in response to fluid pressure on the pilot element 57. Because of the configuration of the pilot element 57 and the attached rod 65, when the sleeve 59 is filled with a compressed fluid the pilot element 57 will move upward, if it is not restrained, until it reaches a second position at which it bears against the upper wall 80 of the stem cavity 78, adding its area to the effective area of the stem 58 on which the fluid pressure acts. The pilot element 57 and the valve stem 58 have dimensions that are suitably proportioned such that when the pilot element does bear against the cavity upper wall 80, the stem will be unseated by the same pressure that caused the stem to be tightly seated while the pilot element was spaced from the cavity upper wall.

Before any blocking liquid is admitted to the valve chamber 72, the compression spring 88 exerts an initial seating force downward on the rod member 65, thereby biasing the pilot element 57 against the bottom wall 79 of the valve stem cavity 78 which, in turn, biases the valve stem 58 downward until is bears against the seat 68. When the pressurized blocking liquid is admitted to the valve chamber 72 including the valve stem cavity 78, the downward force by the spring 88 is overcome and the rod member 65 is urged upward away from the bottom wall 79 of the stem cavity 78. In one particular example, pressure forces incident to the presence of the blocking liquid in the valve at 30,000 p.s.i. tightly seat the valve stem 58 with a force of approximately 24,700 lbs., which is about 1,200 lbs. greater than the force tending to unseat the stem; a pressure load of approximately 2,300 lbs. is also transmitted to the cam 90 at this pressure. Since the cam 90 is subjected to only relatively small loads, the cam bearings (not shown) as well as all the other parts related to the operation of the cam can be made light and small, which further contributes to the low inertia and quick response of the valve. A valve 105 controls the operation of the actuator 91 which is activated by compressed air provided from a compressed air source (not shown) through tube 107. The rod member 65 provides a convenient location for attaching a tripping means external to the valve housing 59 for activating the timing means; for example, a tripping means such as a detent fixed on the rod may activate or trip a microswitch as the rod and valve stem move upward during the liquid discharge operation. The position of the tripping means or the microswitch should be adjustable, such that the discharge of said electrical energy across the electrodes 37 (which ordinarily takes place within about 0.1 millisecond) may be set for any predetermined time in realtion to the release of the second pressurizing fluid from the second compartment 45, e.g., prior to or subsequent to said release.

As will generally be the case, it is not desirable to drain the liquid from the second compartment 45 as rapidly as the release valve 49 will permit. Accordingly, regulating means such as one or more adjustable needle valves are provided between the second compartment and the drainage tank. A single, representative needle valve 92 is shown with a manually adjustable handle 93 and a stem 94 which is axially movable with respect to a valve seat 95 in one of the radial passages 66 in the valve housing 59. The degree of restriction of the radial passages, e.g., 66, 67, thus determines the speed with which the blocking fluid drains from the second compartment 45 which, in turn, affects the speed at which the piston assembly 12 can move into the arc chamber 11. If the stem 94 of the representative needle valve 92 is fully backed away from its seat 95 such that there is no restriction due to flow around the stem, the liquid will be simply pushed out of the compartment as the piston 43 moves forward; even so, the liquid mass flow out of the second compartment imparts some control to movement of the piston assembly 12. Therefore, the needle valves, e.g., 92, are properly characterized as providing not merely control, but a range of control, over the velocity of the piston assembly 12. Each of the needle valve stems, of which stem 94 is representative, is coupled with suitable gears 96 to an ordinary revolution counter 97, which counter is externally mounted on the valve 49, whereby the position of a valve stem 94 with respect to its valve seat 95 may be readily determined as the valve stem is manually rotated.

Since it would be detrimental to the fixed end 33 of the arc chamber 11 to allow the moving piston wall 34 to repeatedly impact against the fixed end, a snubbing or movement checking means 108 is included in or adjacent the housing 10 for controllably arresting the movement of the piston assembly 12. The snubbing means is preferably a hydraulic means, but any means will suffice so long as it prevents the piston from striking the cylinder closed end under the influence of said first biasing means.

The wind tunnel 16 shown diagrammatically in FIGURE 1 has been generally referred to as a hypervelocity wind tunnel, i.e., a wind tunnel suitable for conducting studies at Mach numbers greater than Mach 10. However, this is not meant to be a restriction on the possible application of this apparatus.

In operation of the invention, a desired pressure and temperature of the gas in the arc chamber 11 is obtained by a discharge of electrical energy from source 54 across electrode 37; a desired pressure and temperature is maintained by controlled reduction of the volume of the chamber as the gas therein is vented to the wind tunnel. To this end, the coordinating means controls the initiation of operation of the heating means in relation to the initiation of operation of the volume-reducing means.

The piston having been positioned, as described above, to provide a desired initial volume of the arc chamber, valve 104 is opened to permit gas flow from the compressed gas source 14 through compressor 48 into the arc chamber 11 until a desired gas pressure is attained therein. The blocking fluid is then admitted to the second compartment 45 through the valve 49 and passage 101. The first working fluid is then admitted from gas source 14 through valve 106 to the first compartment 13 and the pressure is increased by compressor 48 until a desired value is obtained. The source of electrical energy 54 is then charged. The valve 105 is then activated which causes the rod of actuator 91 to retract, pulling the cam 90 from its first, resting position to its second, actuated position. The roller 89 is thus allowed to rise, which causes the rod element 65 to rise and, in turn, causes the pilot element 57 to bear against the cavity upper wall 80. The pressure of the blocking fluid in sleeve 59 acting on the stem 58 and pilot element 57 causes the stem to be unseated, which allows the blocking fluid to flow out of the second compartment 45 through the discharge orifices 66, 67 into the tank 77. With the effect of the blocking fluid removed, the piston assembly 12 quickly begins to move toward the chamber fixed end 33. When the piston assembly 12 moves, it causes (through linkage 44) the circuit which includes microswitch 19 to be closed, which, in turn, causes the electrical energy to be discharged across the electrodes 37, as previously described. The temperature of the gas in the arc chamber 11 is substantially instantaneously heated by the electrical discharge. The diaphragm 40 in the discharge orifice 39 is disintegrated as a result of the temperature and/or pressure increase, which accompanies the electrical discharge, and the heated gas begins to flow out of the arc chamber 11 into the nozzle 17 and thence to the wind tunnel 16. The piston assembly 12 continues to move into the arc chamber 11, reducing the volume of the chamber as the gas is vented to the nozzle 17.

If it is desired to maintain constant testing conditions in the wind tunnel, then the pressure in the arc chamber 11 must be maintained at a constant value (disregarding heat losses) during the test run, and thus the volume of the chamber must be reduced at an appropriate, constant rate. Since the volume of the arc chamber 11 is merely a variable which is dependent on the position of the piston assembly 12, it then is the velocity of the piston assembly 12 that primarily influences the maintaining of constant testing conditions in the wind tunnel 16. The sudden increase of pressure which accompanies the arc discharge introduces a first force which opposes the inward movement of the moving piston 43. Too, the original test gas pressure in the arc chamber 11, though much smaller than the arc discharge pressure, does contribute a further opposing force, as do the damping characteristics of the piston assembly 12 sliding in the bore 25, all three of which opposing forces have values sufficiently uniform to be calculated within about 1 millisecond from the initiation of the arc discharge. If these combined, resisting forces are planned so that they will equal the driving force of the first, biasing fluid, then the acceleration of the moving piston assembly 12 will drop to zero, and the piston will continue moving at the velocity it had attained before the driving and opposing forces cancelled one another. Thus, the heated test gas is vented to the wind tunnel 16 at a constant pressure if the rate at which the volume of the arc chamber 11 is being decreased, i.e., the compression rate, is constant and is equal to the rate at which gas is being vented to the wind tunnel. Conversely, if the venting rate is less than the compression rate, then the pressure of the test gas in the arc chamber 11 (and thus the pressure of gas in the wind tunnel) will increase during a single test. This second condition, wherein the compression rate exceeds the venting rate, can naturally provide a means of increasing the Reynolds number during a single test in a hypervelocity wind tunnel. This is of particular advantage when it is desired to simulate atmospheric reentry conditions as nearly as possible during a single test, for instance, a reentry test wherein it is desired to simulate the trajectory of a nose cone as it encounters denser air when it comes closer to earth. When the venting rate is less than the controlled compression rate, then the pressure of the gas supplied to the wind tunnel 16 will decrease at a controlled rate. Regardless of the choice in relationship between the venting and the compression rate, the apparatus extends the usable run time of the wind tunnel 16 without increasing the volume of the arc chamber 11.

Another advantageous property of the apparatus is that the volume-reducing means as shown is moving in the same direction as the gas is moving when the same is vented to the wind tunnel. Thus, the kinetic energy added to the gas by the chamber moving wall 34 is more beneficial when said moving wall is oriented substantially perpendicularly to the axis of and moves linearly toward the discharge orifice 39 and the nozzle 17. However, this advantage does not negate the use of some other volume-reducing means, e.g., a cam having a surface which forms one wall of the arc chamber and which is rotatable in such a way that the volume of the chamber can be reduced thereby, said wall following an arcuate path as it moves into the arc chamber.

The degree of closure of the one or more of the needle valves, e.g., valve 92, easily and conveniently affects the speed with which liquid is drained from the second compartment 45, which in turn affects the velocity of the piston assembly 12 as it moves toward the chamber fixed end 33. The manually adjustable needle valve 92 shown and described can be replaced by an automatic valve, e.g., a solenoid-actuated valve, which automatic valve provides a variable rate of discharge and thus a variable piston acceleration and velocity during a single test. With any chosen valve, the discharge rate is adjustable to some degree, and the problem of unwanted pressure decay which is inherent in previous arc chambers is not found in the subject apparatus.

To further describe operation of the apparatus, an example of the procedure which is used to define the initial conditions of the apparatus for a typical run is now provided. Initially, the desired Mach number and Reynolds number for the test must be chosen; they have been selected, for example, as Mach 17 with a Reynolds number of $1.0 \times 10^6$ per foot for this example. Next, the density of the test gas in the arc-chamber 11, the energy density in the chamber (electrical energy divided by arc chamber volume) and the tunnel nozzle-throat diameter are defined just as they would be for a commonly known, fixed-volume arc chamber. After selecting the initial gas density as 120 atmospheres, a comparison with a plot of arc chamber pressures (after discharge) versus the stated objectives of Mach 17, etc., shows the arc chamber pressure should be maintained at 14,000 p.s.i.a. if testing conditions are to be constant in the tunnel 16. The temperature in the arc chamber 11, as determined from charts plotted from experimental data, should be 2170° K. The energy required to heat a given volume of gas at 120 atmospheres from room temperature to 2170° K. is then computed as 5,613 joules/cubic inch. From experience it is known that the efficiency of the arc configuration in converting electrical energy into heat energy of the gas is about 92% when the initial gas density is 120 atmospheres. The initial volume of arc chamber 11 which is required is then calculated by multiplying the available electrical energy (271,200 joules) by the transfer efficiency (.92), and then dividing this product by the energy density (5,613 joules/cubic inch), which provides an answer of 44.45 cubic inches. This calculated volume is within the adjustable range of the piston assembly 12, so the mechanical stop 42 is positioned to provide this volume. Since the physical size of the tunnel test section is known, as well as the effective diameter of flow at free stream velocity, a suitable nozzle-throat diameter may be calculated or selected from experience; a diameter of 0.100 inch would be typical for this example.

Since the stated objectives of Mach and Reynolds numbers will be obtainable immediately after discharge of the arc between the electrodes 37, the next consideration becomes the required piston assembly speed to properly compensate for mass flow of the gas through the nozzle 17. A readily apparent, advantageous time to fire the arc would be just when the released piston assembly 12 has reached the correct velocity; however, experience has shown that because of the very short transient times between the initiation of the arc and the realization of uniform conditions in the arc chamber 11, and the short time it requires for the piston assembly 12 to reach the correct speed after being released, a slight variation from ideal timing will not be fatal to a successful test. Thus, the time of the arc discharge is set, for example, at about 0.001 second after piston release. To continue the example, the pressure of the pneumatic working fluid is set at 15,000 p.s.i.g. to provide fast response of the piston 43; if this pressure is too great according to calculated requirements, the pressure of the hydraulic fluid is properly maintained to set off the portion of the pneumatic pressure which is unneeded. Knowing the conditions in the arc chamber 11, the nozzle throat conditions can be computed; for this example a mass flow rate of 11.083 atm. ft.³/sec. is found. The mass of gas to be displaced during a complete stroke is equal to the product of the initial density (120 atm.) and the change in volume of the arc chamber (39.88 cu. in); converted to cubic feet, this product equals 2.769 atm. ft.³. The time required for the stroke is equal to the mass flow (2.679 atm. ft.³) divided by the mass flow rate (11.083 atm. ft.³/sec.), and equals 0.25 second for this example. Finally, the piston velocity is calculated by dividing the stroke length by the time for said stroke, which equals 21.91 in./sec. A calibration curve is then used to determine the needle valve counter settings to provide the necessary piston assembly velocity.

Regardless of the velocity of the piston wall 34 as it moves from its first location to a second location nearer the chamber fixed wall 33, it is snubbed just before it might strike the fixed wall. The fact that the piston wall 34 travels substantially throughout the entire length of the arc chamber 11 means that substantially all of the test gas that is initially heated and pressurized is vented to the wind tunnel 16; this characteristic of the apparatus naturally increases the overall efficiency of the arc chamber by providing a long run-time per given quantity of electric power input. Because of this lengthened run-time, as many as 100 cycles of model motion can be obtained with high-frequency, dynamic test models that oscillate during a test. A further advantage of the apparatus is that the volume of the arm chamber 11 decreases during a test; consequently, the internal surface area of the arc chamber decreases, and the opportunity for heat losses from the test gas to the chamber wall is reduced in direct proportion to the reduced surface area.

The small initial volume of the arc chamber 11 contributes to an additional advantage in that only a minimum amount of electrical energy need be discharged as a spark between the two spaced electrodes 37. That is, substantially all of the heated test gas is usable; therefore, most of the heat added to said gas is productive heat. Since very little heat is wasted by heating unused gas, the discharge of electrical energy during a test is substantially the least possible amount required to heat the gas in the arc chamber 11. Holding the discharge to a minimum is of course economical of electrical energy, but it also minimizes the possibility of gas contamination from electrode decomposition.

While only one embodiment of the invention, together with modifications thereof, has been described in detail herein and shown in the accompanying drawing, it will be evident that various further modifications are possible in the arrangement and construction of its components without departing from the scope of the invention.

We claim:

1. In an apparatus for producing a high-velocity stream of heated gas comprising a gas-filled chamber, electrical heating means operable for heating the gas in said chamber, a wind tunnel nozzle, and means for establishing communication between the nozzle and the chamber upon operation of the heating means, the combination therewith of:
   volume-reducing means for reducing the volume of said chamber in predetermined timed coordination with the operation of said heating means.

2. An apparatus for supplying a high-velocity stream of heated gas to a wind tunnel nozzle for an extended period of time, comprising:
   a variable-volume, gas-filled chamber;
   electrical heating means operable for heating the gas in said chamber;
   volume-reducing means operable for reducing the volume of said chamber in predetermined timed coordination with operation of said heating means;
   and means for establishing communication between the nozzle and the chamber in predetermined timed coordination with operation of said electrical heating and volume-reducing means.

3. The apparatus of claim 2, said chamber having a fixed wall and a movable wall, said movable wall comprising a piston element slidably movable into said chamber, said piston element having a first location spaced from said fixed wall, and said volume-reducing means including means for moving said piston element from said first location to a second location nearer said chamber fixed wall.

4. The apparatus set forth in claim 2, said variable-volume chamber having a fixed wall and a movable wall and said volume-reducing means having operable connection with said movable wall for moving the same relative to said fixed wall to reduce the volume of the chamber, and
   said means for establishing communication between said nozzle and said chamber comprising an opening in said fixed wall providing communication between said nozzle and chamber and further comprising means releasably stopping said opening.

5. An apparatus for supplying a high-velocity stream of heated gas to a wind tunnel nozzle, comprising:
   a variable-volume, gas-filled chamber;

electrical heating means operable for heating the gas in said chamber;

volume-reducing means operable for reducing the volume of said chamber;

coordinating means for controlling the initiation of operation of said heating means in relation to initiation of operation of said volume-reducing means; and means for establishing communication between the wind-tunnel nozzle and the chamber in predetermined timed coordination with operation of said electrical heating and volume-reducing means.

6. An apparatus for supplying a stream of heated gas to a wind tunnel nozzle comprising:

a variable-volume, gas-filled chamber;

electrical heating means operable for heating the gas in said chamber;

volume-reducing means operable for reducing the volume of said chamber;

coordinating means for initiating operation of said heating means subsequent to initiation of operation of said volume-reducing means; and means for establishing communication between the wind tunnel nozzle and the chamber in predetermined timed coordination with operation of said electrical heating and volume-reducing means.

7. An apparatus for supplying a stream of heated gas to a wind tunnel nozzle comprising:

a variable-volume, gas-filled chamber;

electrical heating means operable for heating the gas in said chamber;

volume-reducing means operable for reducing the volume of said chamber;

coordinating means for initiating operation of said volume-reducing means subsequent to initiation of operation of said heating means; and means for establishing communication between the wind tunnel nozzle and the chamber in predetermined timed coordination with operation of said electrical heating and volume-reducing means.

8. An apparatus for supplying a high-velocity stream of heated gas to a wind tunnel nozzle for an extended period of time, comprising:

a variable-volume, gas-filled chamber having a fixed wall and a movable wall;

electrical heating means for heating the gas in the chamber;

means for storing potential energy;

means for controlled release of said potential energy in predetermined timed coordination with operation of said electrical means for moving said movable wall toward said fixed wall; and means for establishing communication between the nozzle and the chamber in predetermined timed coordination with operation of said electrical heating means.

9. The apparatus of claim 8, said means for storing potential energy comprising:

an activating chamber rigidly fixed relative to said variable-volume chamber;

a piston slidably mounted in and dividing said activating chamber into first and second compartments;

means connecting the piston and said movable wall for positioning said movable wall in accordance with position of the piston, said piston being movable between a first position in which the movable wall is spaced from said fixed wall and a second position in which the movable wall is closer to the fixed wall;

a gas enclosed in the first component and under a high pressure urging the piston from its first to its second position; and a fluid in the second compartment holding the piston in its first position.

10. The apparatus recited in claim 9, the fluid in the second compartment being a liquid.

11. The apparatus of claim 9, said means for release of said potential energy comprising means for release of said fluid from said second compartment at controlled rate.

12. The apparatus of claim 9, said means for controlled release of said potential energy including means for releasing the fluid in said second compartment comprising:

a cylindrical sleeve having a first end in communication with said second compartment, a second end, means for closing said second end, a port, and a discharge orifice;

an internal valve seat annularly disposed in said sleeve between said sleeve first end and said discharge orifice;

a valve stem slidably movable within said sleeve, the stem having first and second ends and a passage extending therebetween, said stem second end and said sleeve second end and a portion of the sleeve therebetween forming a sleeve chamber, said first end having a surface shaped for mating with said valve seat, the stem further having means blocking said discharge orifice when the stem is seated against said valve seat and unblocking said discharge orifice when said stem is unseated, said passage having a first opening in said stem first end communicating with said fluid-filled second compartment and having a second opening in said stem second end communicating with said sleeve chamber;

a pilot element connected with said valve stem and movable relative thereto, said pilot element and said valve stem having dimensions suitably proportioned such that the pressure of fluid in said sleeve causes said valve stem to be tightly seated against said valve seat when said pilot element is in a first position at which it transmits substantially no load to said valve stem, and further causes said valve stem to be unseated when a said pilot element is in a second position at which it transmits loads to said valve stem, which loads are imposed on said pilot element by the pressure of fluid in said sleeve;

means sealably extending through said sleeve port for moving said pilot element from said first to said second position; and means in communication with said discharge orifice for receiving fluid from said sleeve.

13. An apparatus for supplying a high-speed stream of heated gas to a wind tunnel nozzle comprising:

a variable-volume chamber having a wall and filled with a compressed gas;

electrical heating means operable for rapid heating of the gas;

means for providing a metered flow of said gas from the chamber into the nozzle, said means including an orifice of given size in said wall and providing communication between the chamber and nozzle;

volume-reducing means operable for reducing the volume of the chamber during the time of said metered flow at a rate providing control of fluid pressure in said chamber; and means for closing said orifice and for establishing communication through the same between the chamber and nozzle in predetermined timed coordination with operation of said volume-reducing and electrical heating means.

14. The apparatus claimed in claim 13, said volume-reducing means being operable for reducing the volume of the chamber at a rate maintaining substantially constant pressure in said chamber substantially throughout the flow.

15. The apparatus claimed in claim 14, said volume-reducing means being operable for reducing the volume of the chamber at a rate increasing pressure in said chamber during said flow.

16. The apparatus claimed in claim 14, said volume-reducing means being operable for reducing the volume of the chamber at a rate producing a controlled rate of pressure decrease in said chamber during said flow.

17. An apparatus for supplying a stream of heated gas to a wind tunnel nozzle comprising:
- a variable-volume chamber having an orifice therein opening into said wind tunnel and filled with a compressed gas;
- volume reducing means operable for controllably reducing the volume of said gas-filled chamber;
- at least two spaced electrodes extending into said chamber;
- means for substantially instantaneously transferring energy to said compressed gas in said chamber, said means comprising means for generating a high-temperature electric discharge between said electrodes;
- timing means for controlling the generation of said electric discharge in relation to operation of said volume-reducing means; and
- means in said orifice for placing said chamber in communication with said wind tunnel nozzle in coordination with operation of said volume-reducing means.

18. An apparatus for supplying a stream of heated and pressurized gas to a wind tunnel for an extended period of time, comprising:
- a source of pressurized gas;
- a housing having a bore;
- a closed arc chamber within said housing, said chamber being coaxial with said bore and having a fixed wall, a movable wall spaced opposite and adapted to be moved toward said fixed wall, a discharge orifice in said fixed wall, and a rupturable diaphragm sealingly covering said discharge orifice, said chamber having an inlet for the introduction of said test gas;
- means for transferring a predetermined quantity of gas from said source to said arc chamber;
- a pair of diametrically spaced electrodes extending into said chamber;
- a source of electrical energy connected with said electrodes;
- means for the substantially instantaneous transfer of energy to said gas in said chamber, said means comprising means for discharging a predetermined amount of said electrical energy across said electrodes;
- a piston element slidably movable in said bore and chamber, said piston having a first end constituting said movable wall of said arc chamber, a second end extending exteriorly of said housing, and an annular projection between said two ends;
- adjustable limiting means external to said housing adapted to abut against said piston second end for adjusting the initial position of said piston with respect to said fixed wall;
- an activating chamber coaxial with said bore and of larger diameter than said bore and sealingly and slidably receiving said annular projection on said piston, whereby said projection divides the activating chamber into first and second compartments;
- means for introducing gas from said source of pressurized gas into the first compartment;
- a source of liquid under pressure;
- means for introducing liquid from said source into the second compartment and for controlled release of said liquid from said second compartment;
- timing means for initiating discharge of said electrical energy across said electrodes at a predetermined time in relation to the release of said liquid from said second compartment; and
- snubbing means to prevent said slidable piston from striking said fixed wall in said arc chamber.

References Cited

UNITED STATES PATENTS

| | | | |
|---|---|---|---|
| 2,967,926 | 1/1961 | Edstrom | 219—121 |
| 3,004,189 | 10/1961 | Giannini | 219—75 |
| 3,029,635 | 4/1962 | Fetz | 219—121 |
| 3,066,528 | 12/1962 | Giannini et al. | 313—231 |
| 3,184,097 | 5/1965 | Kilmer et al. | 73—147 |
| 3,201,635 | 8/1965 | Carter | 313—231 |
| 3,205,338 | 9/1965 | Sunnen | 313—231 |
| 3,229,155 | 1/1966 | Carlson et al. | 219—121 |
| 3,279,177 | 10/1966 | Ducati | 219—121 |

RICHARD M. WOOD, *Primary Examiner.*

W. DEXTER BROOKS, *Assistant Examiner.*

U.S. Cl. X.R.

219—75; 73—147